United States Patent
Obata et al.

(10) Patent No.: US 7,804,554 B2
(45) Date of Patent: Sep. 28, 2010

(54) SURFACE EMITTING DEVICE AND LIQUID CRYSTAL DISPLAY

(75) Inventors: Kei Obata, Miyagi (JP); Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 11/814,742

(22) PCT Filed: Dec. 7, 2006

(86) PCT No.: PCT/JP2006/324463

§ 371 (c)(1),
(2), (4) Date: Jul. 25, 2007

(87) PCT Pub. No.: WO2007/066729

PCT Pub. Date: Jun. 14, 2007

(65) Prior Publication Data

US 2009/0009686 A1    Jan. 8, 2009

(30) Foreign Application Priority Data

Dec. 9, 2005    (JP) ............................ P2005-357052

(51) Int. Cl.
*G02F 1/1335*    (2006.01)
(52) U.S. Cl. .............................. 349/62; 349/64; 349/70
(58) Field of Classification Search ............... 349/61, 349/62, 64, 70
See application file for complete search history.

(56) References Cited

U.S. PATENT DOCUMENTS

| 7,397,522 | B2 * | 7/2008 | Lee et al. ........................ 349/65 |
| 7,573,550 | B2 * | 8/2009 | Lubart et al. .................. 349/113 |
| 2005/0128377 | A1 * | 6/2005 | Park et al. ....................... 349/61 |
| 2005/0243551 | A1 * | 11/2005 | Onishi et al. ................. 362/244 |
| 2006/0215386 | A1 |  9/2006 | Hatanaka et al. |

FOREIGN PATENT DOCUMENTS

| JP | 5-333333 | 12/1993 |
| JP | 6-250178 | 9/1994 |
| JP | 10-283818 | 10/1998 |
| JP | 2005-13611 | 2/2005 |
| JP | 2005-117023 | 4/2005 |
| JP | 2005-322524 | 11/2005 |

* cited by examiner

*Primary Examiner*—Richard H Kim
(74) *Attorney, Agent, or Firm*—K&L Gates LLP

(57) ABSTRACT

To provide source images is increased to enhance the uniformity of luminance distribution. A surface emitting device includes: a diffusing sheet constituting a light exiting surface; a reflector disposed opposite to the diffusing sheet; light sources disposed between the diffusing sheet and the reflector; and a prism sheet (light-source-image division sheet) disposed between the diffusing sheet and the light sources. The prism sheet has linear protrusions on the front surface thereof, and a flat portion parallel to the sheet surface between the adjacent linear protrusions. This generates light-source images through the flat portions in addition to the divided light-source images through the linear protrusions 16a to increase the number of light-source images, thereby improving luminance uniformity.

5 Claims, 13 Drawing Sheets

FIG. 2
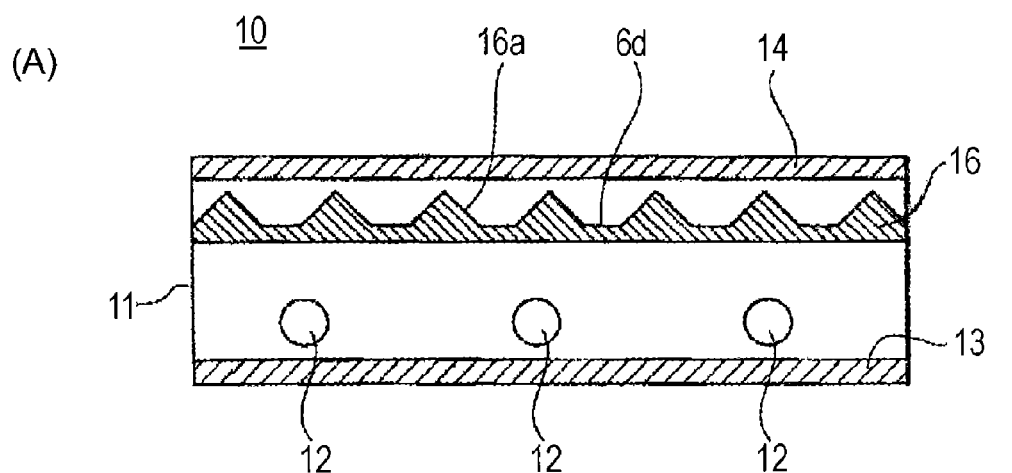
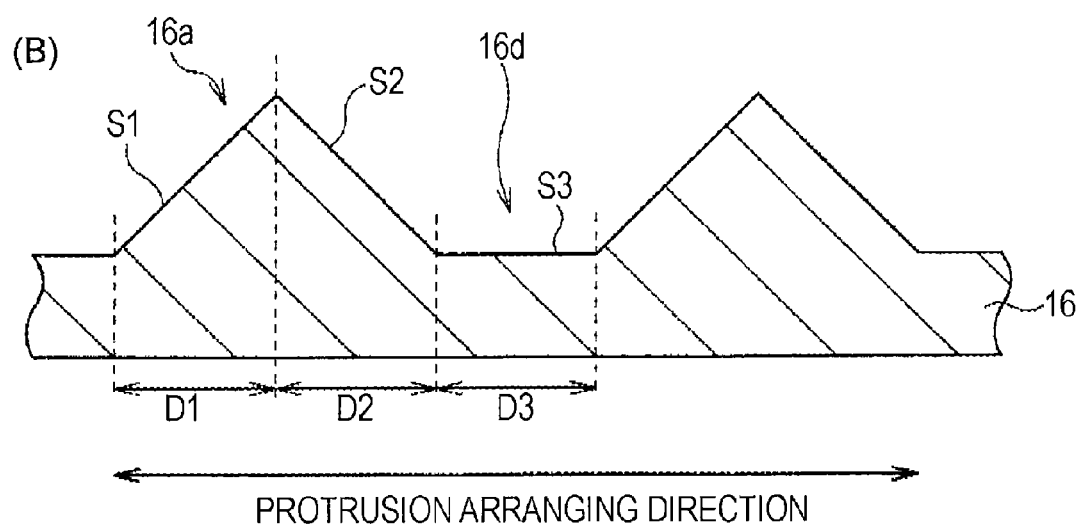
PROTRUSION ARRANGING DIRECTION

FIG. 4
(A)
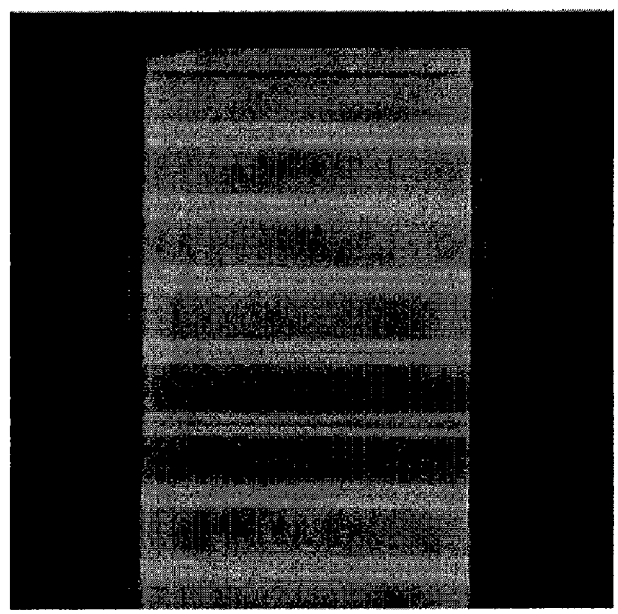
(B)
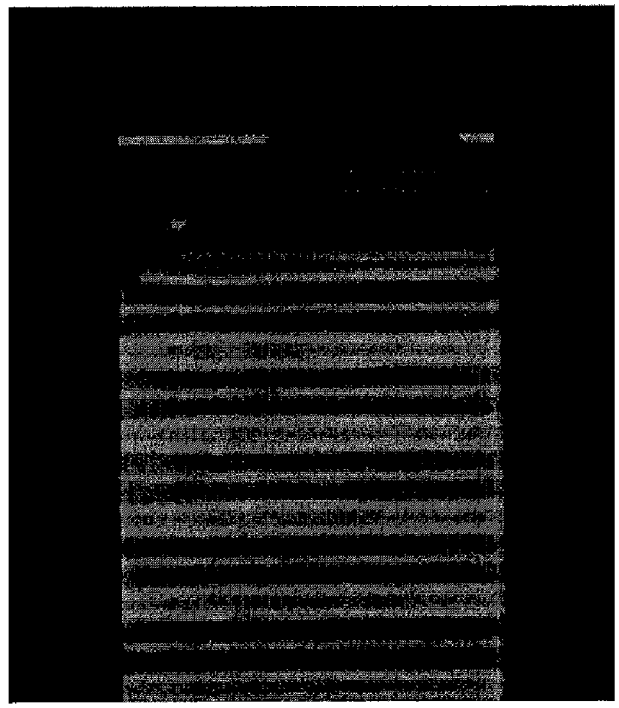

FIG. 14
(A)
LUMINANCE DISTRIBUTION
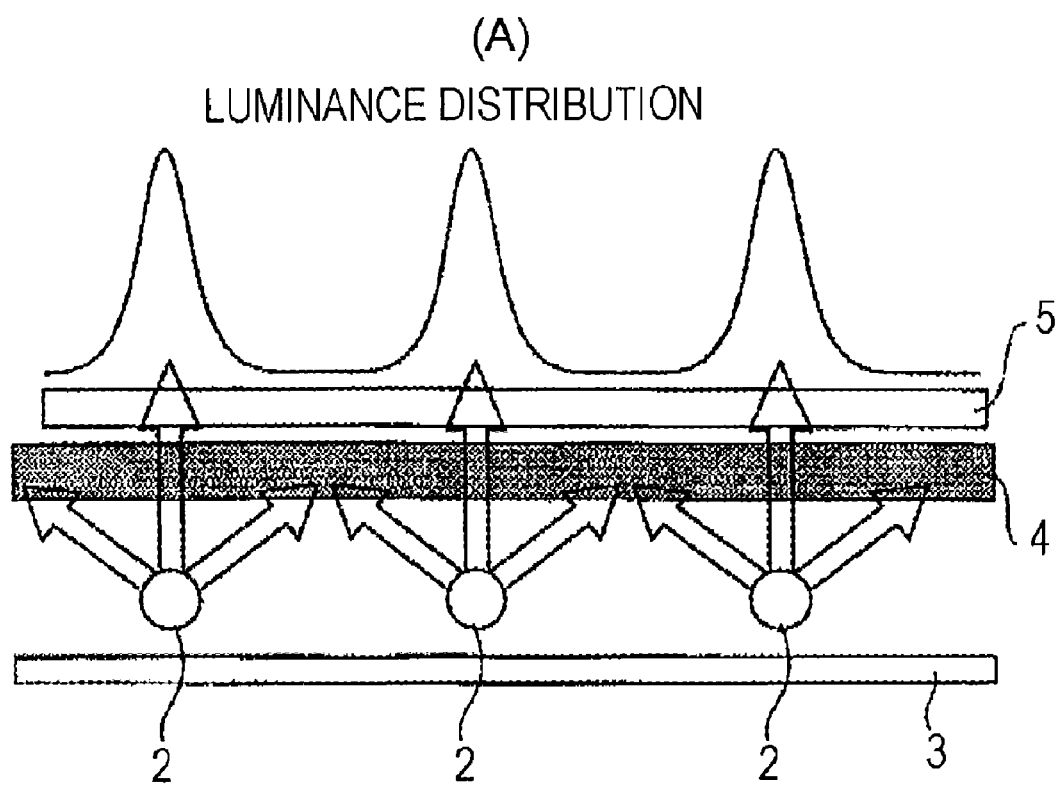
(B)
LUMINANCE DISTRIBUTION
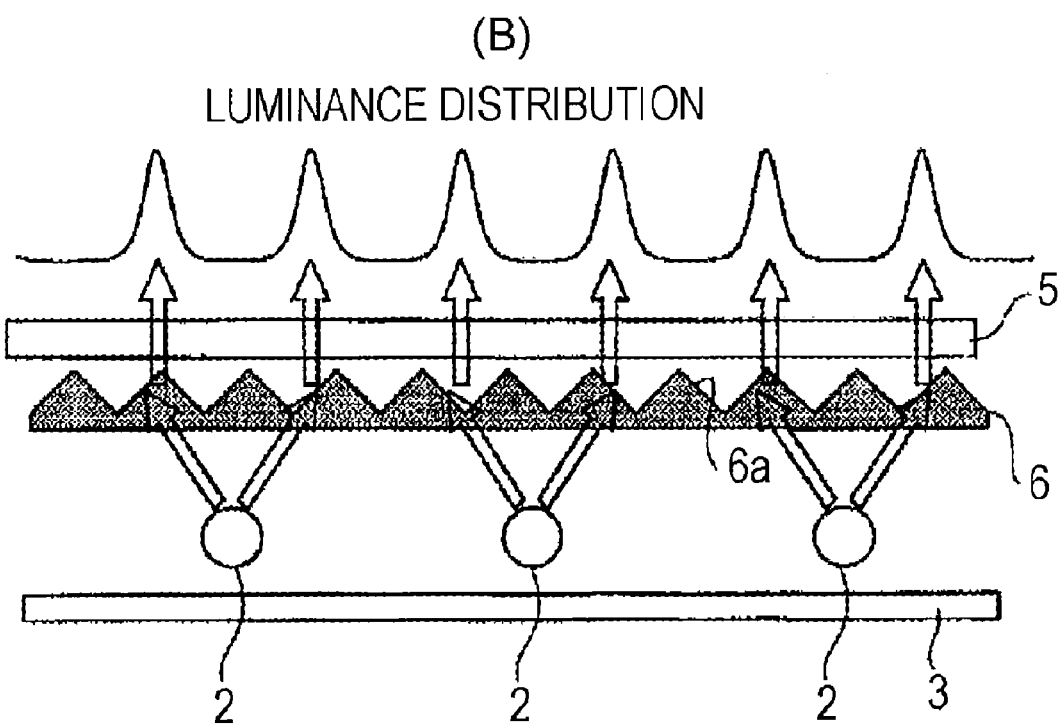

SURFACE EMITTING DEVICE AND LIQUID CRYSTAL DISPLAY

CROSS REFERENCE TO RELATED APPLICATIONS

The present application claims priority to Japanese Patent Application JP 2005-357052, filed on Dec. 9, 2005, the entire contents of which is being incorporated herein by reference.

BACKGROUND

The present disclosure relates to a surface emitting device suitable for use as a direct-lighting backlight unit of a liquid crystal display or the like and a liquid crystal display including the same.

Liquid crystal displays having a low-profile and easily viewable backlight (surface emitting device) have been used as displays of word processors, laptop personal computers and so on. To meet the need for such lightweight and low-profile backlights for liquid crystal displays, edge-lighting type backlight units have been mainstream in which a line light source such as a fluorescent tube is disposed at the side end of a transparent plate (light guide), and a liquid-crystal display panel is disposed on the light guide with a light diffusing sheet or the like in between.

However, such edge-lighting backlight units often become lacking in luminance as displays are becoming larger in size in recent years. Therefore, direct-lighting type backlight units come into use in which a line light source and a light diffusing sheet are disposed directly under a liquid crystal panel.

FIG. 13 is a schematic perspective view of a conventional direct-lighting type backlight unit 1. The direct-lighting type backlight unit 1 includes line light sources 2 such as fluorescent tubes, a reflector 3, a diffuser 4 and a diffusion sheet 5 serving as light diffusing sheet. The reflector 3 is disposed under the line light sources 2. The diffuser 4 is disposed above the line light sources 2. The diffusion sheet 5 is disposed on the diffuser 4. The diffuser 4 and the diffusion sheet 5 form the light-exiting surface of the backlight unit.

In this backlight unit 1, the light emitted from the line light sources 2 exit from the diffuser 4 and the diffusion sheet 5. The luminance of the light of the backlight unit 1 is high directly above the line light sources 2 and low above the portions between the light sources 2, as shown in FIG. 14(A).

Therefore, it is known to provide a prism sheet 6 between the line light sources 2 and the diffusion sheet 5 so as to divide the light-source image (emission line), as shown in FIG. 14(B) (refer to Japanese Unexamined Patent Application Publication No. 5-333333, Japanese Unexamined Patent Application Publication No. 6-250178, and Japanese Unexamined Patent Application Publication No. 10-283818). FIG. 14(B) shows an example in which a prism sheet 6 is used as a light-source image dividing sheet in place of the diffuser 4 in FIG. 14(A). The prism sheet 6 is an optical film which is generally used as a luminance raising film, and has a plurality of triangular-cross-section linear protrusions (prisms) 6a disposed continuously at regular pitches on the front or back surface.

The prism sheet 6 is disposed so that the edge lines of the linear protrusions 6a are in parallel to the extending direction of the line light sources 2. This doubles the light-source image of the light exiting from the diffusion sheet 5 in comparison with that without the prism sheet (FIG. 14(A)), thereby distributing the luminance uniformly.

The above-described method of dividing the light-source image using the prism sheet 6 needs to divide the light-source image into two main images at a short interval so as to distribute the luminance uniformly in an efficient manner.

FIG. 15 is an optical path diagram showing the relationship between the prism sheet 6 and the line light source 2. Light L1 emitted from the line light source 2 in the direction of the normal to the prism sheet 6 is totally reflected by the slopes (prism surfaces) of the linear protrusions 6a of the prism sheet 6 to return to the line light source 2, and is again used as light incident on the prism sheet 6. Light L2 that enters the prism sheet 6 at an angle is raised to the front surface (in the direction of the normal) by the linear protrusions 6a, and exits therefrom to form light-source images LA. Light L3 that enters the prism sheet 6 at a larger angle is reflected by the bottom surface of the prism sheet 6 to be returned to the line light source 2. Accordingly, the light from one line light source 2 is divided into two light-source images LA at the front surface of the prism sheet 6.

In short, the conventional backlight unit 1 using the light-source image dividing sheet 6 can divide the light into only two main light-source images, which is not enough to distribute the luminance uniformly.

SUMMARY

In an embodiment, there is provided a surface emitting device in which the number of divisions of the main light-source image is increased to enhance the uniformity of luminance distribution and a liquid crystal display having the same.

A surface emitting device according to an embodiment includes: a diffusing sheet constituting a light exiting surface; a reflector disposed opposite to the diffusing sheet; a plurality of light sources disposed between the diffusing sheet and the reflector; and a light-source-image division sheet disposed between the diffusing sheet and the light sources. The light-source-image division sheet has a plurality of linear, conical, or pyramidal protrusions on at least one of the front and back surfaces thereof; and has a flat portion parallel to the sheet surface between the adjacent protrusions.

A surface emitting device according to an embodiment includes: a diffusing sheet constituting a light exiting surface; a reflector disposed opposite to the diffusing sheet; a plurality of light sources disposed between the diffusing sheet and the reflector; and a light-source-image division sheet disposed between the diffusing sheet and the light sources. The light-source-image division sheet has a plurality of linear, conical, or pyramidal protrusions on at least one of the front and back surfaces thereof; and has a flat portion parallel to the sheet surface at part of the protrusion.

According to an embodiment, the light-source-image division sheet has a flat portion parallel to the sheet surface between the adjacent linear, conical, or pyramidal protrusions or at part of the protrusions. This generates light-source images through the flat portions in addition to the divided light-source images through the linear protrusions to increase the number of light-source images, thereby improving luminance uniformity. Accordingly, the use of the surface emitting device as the backlight for a liquid crystal display or the like prevents unevenness in the luminance of images, thereby improving the image quality.

The diffusing sheet is a broad concept including a relatively thick diffuser and diffusion film, which includes films having the function of diffusing the light exiting from a light source over a specified angle. The diffuser and the diffusion sheet may be used by itself or in conjunction.

The protrusions formed on the light-source-image division sheet may be triangular cross-section prisms. The prisms may have any base angle or vertical angle, pitch, height, and the like. The protrusions may not only be prism-shaped but also be circular or elliptical in cross section, or may have a lens function. The protrusions may be any of linear shapes (e.g., prisms or cylindrical-lenses), cones and pyramids. The flat portion formed at part of a protrusion may be formed on the top or on the slope of the protrusion.

The protrusions may be formed either on the front or back of the sheet, or on both of the front and back surfaces. The light-source-image division sheet may be at least one, or alternatively, a combination of two or more according to the specification.

The light sources are not necessarily line light sources and may be a plurality of point light sources such as linearly arranged light emitting diodes (LEDs).

The surface emitting device and the display unit of the embodiment have a flat portion, which is parallel to the light-source-image division sheet, at least at one of the portions between the adjacent linear, conical, or pyramidal protrusions and part of the protrusions. This generates light-source images through the flat portions in addition to the divided light-source images through the linear protrusions to increase the number of light-source images, thereby improving luminance uniformity.

BRIEF DESCRIPTIONS OF THE FIGURES

FIG. 2(A) is a side-sectional view of the surface emitting device of FIG. 1; and FIG. 2(B) is a cross-sectional view of a prism sheet;

FIG. 4(A) is a picture of a light-source image viewed through the prism sheet shown in FIG. 1; and FIG. 4(B) is a picture of a light-source image viewed through a conventional prism sheet;

Figure 1:
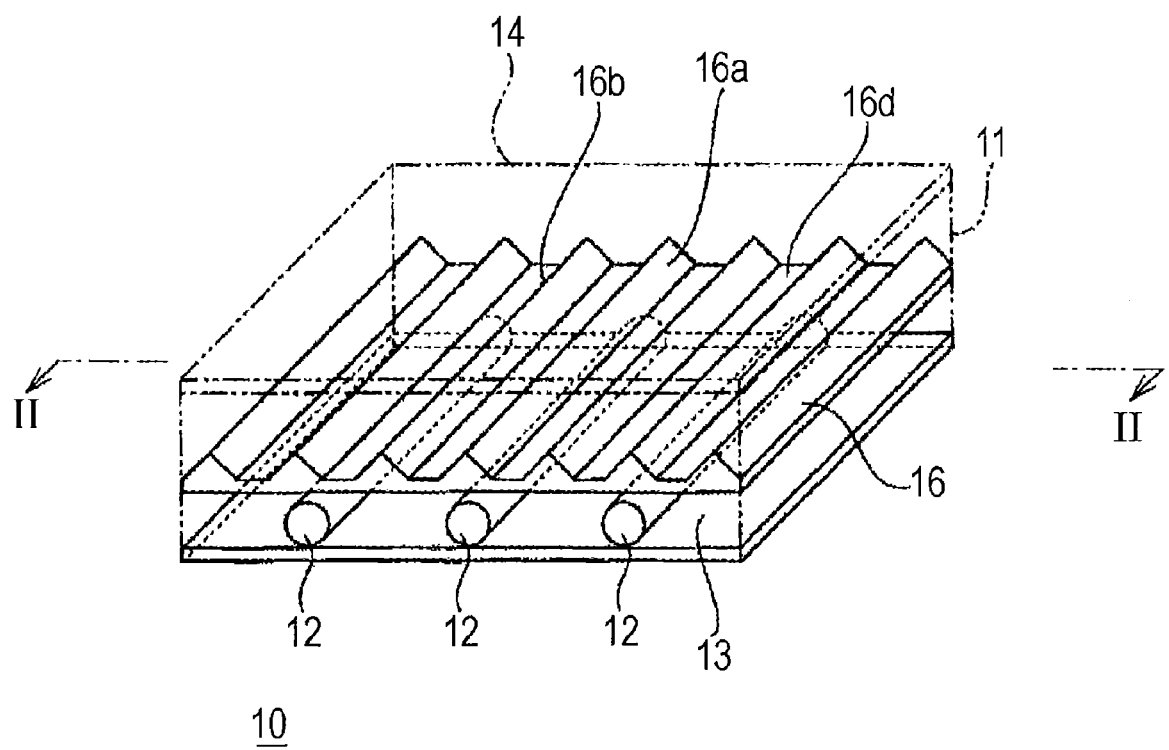
FIG. 1 is a schematic perspective view of a surface emitting device according to a first embodiment.
Figure 7:
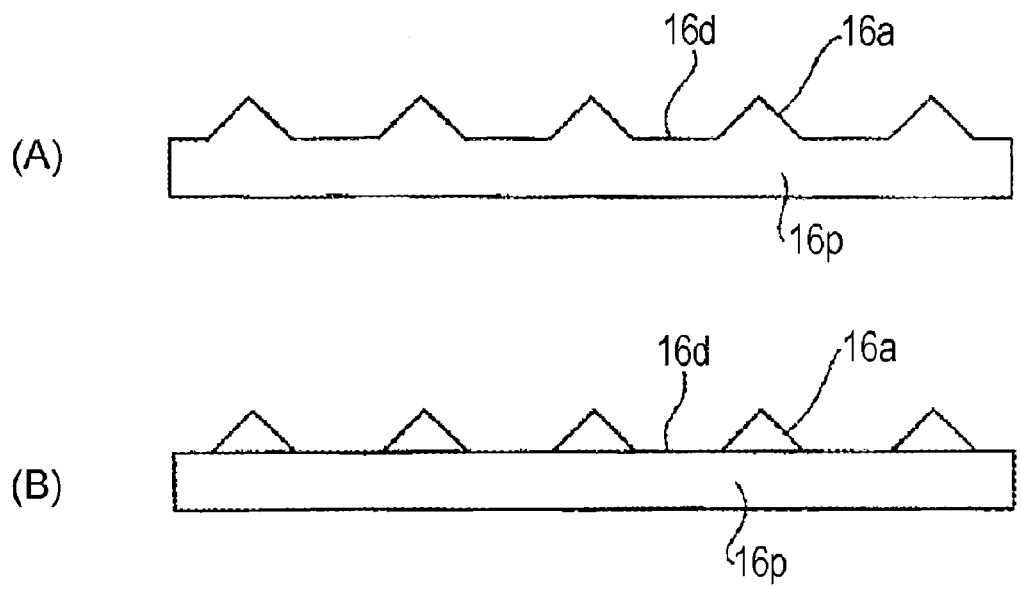
Figure 8:
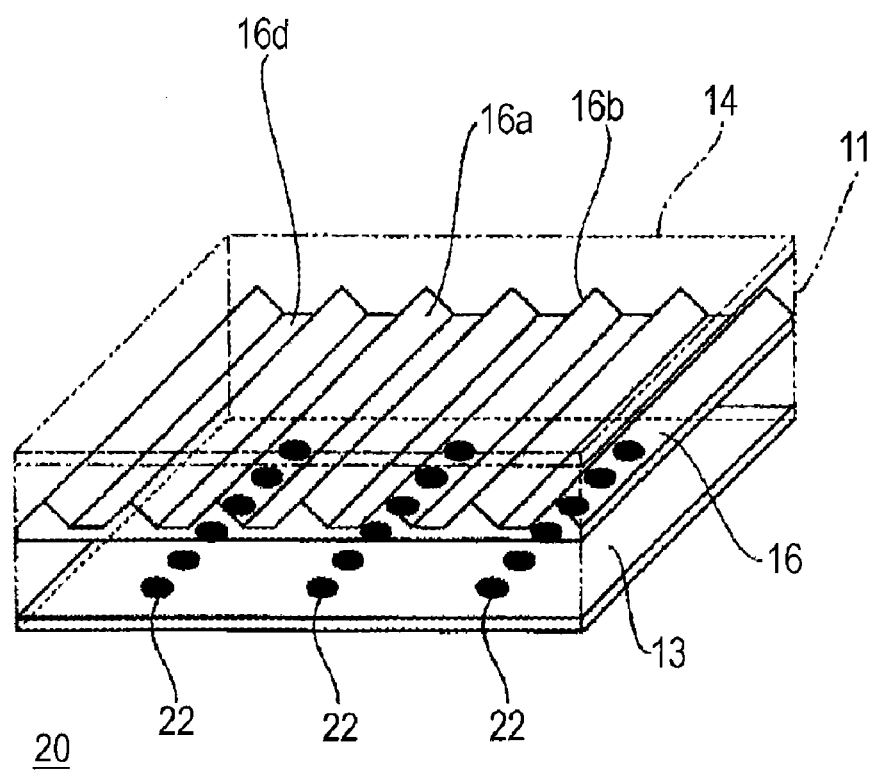
Figure 9:
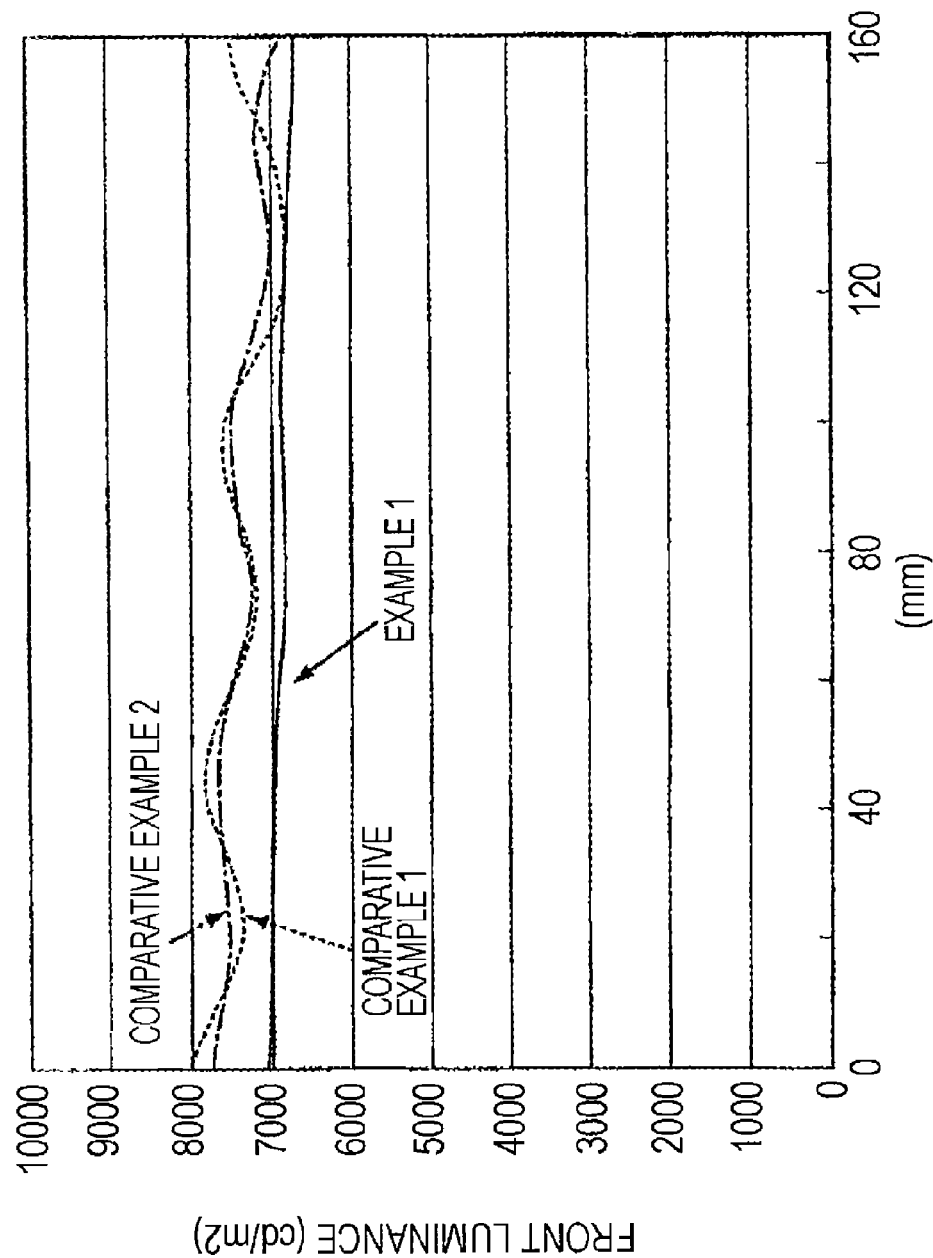
Figure 10:
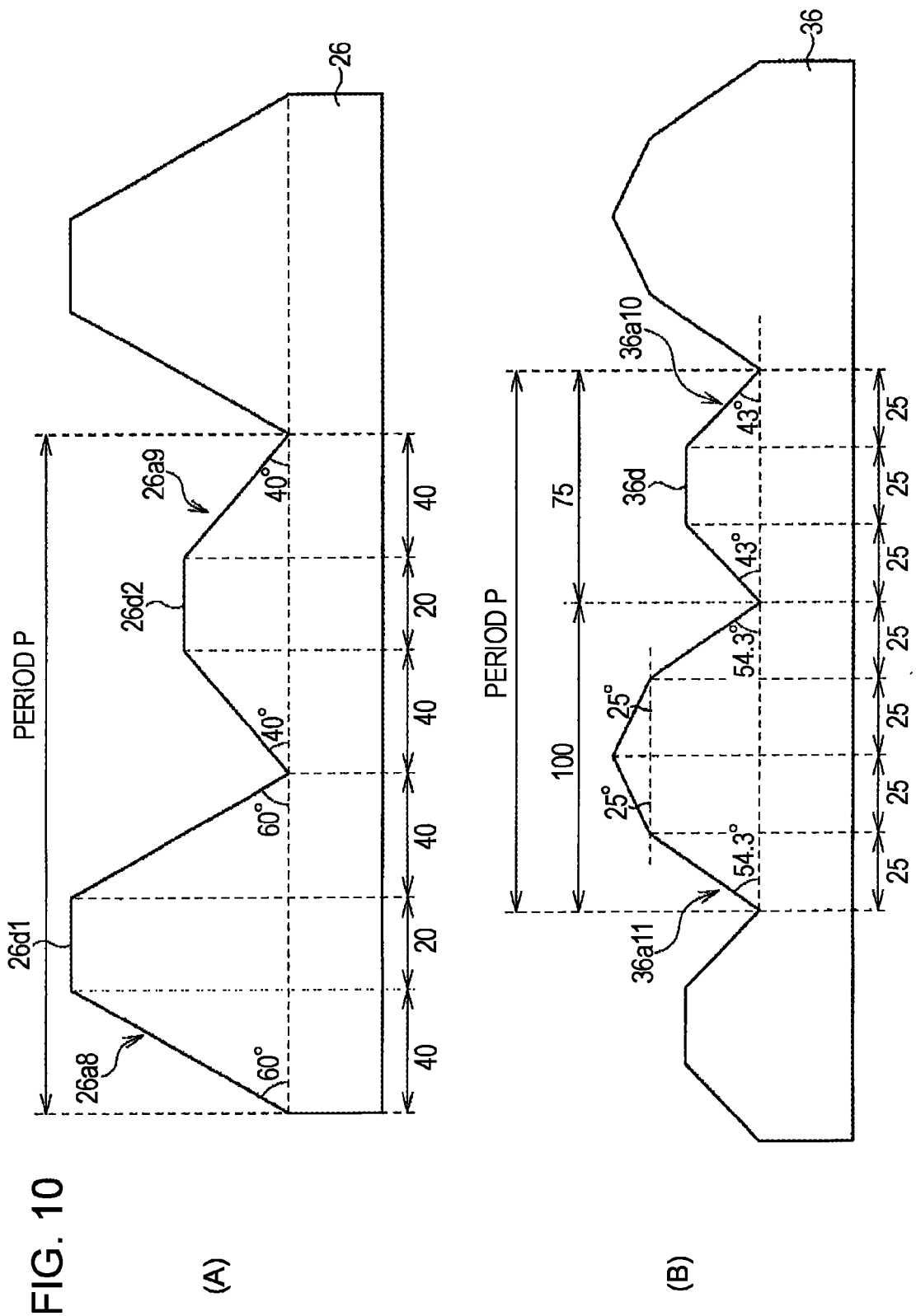
Figure 11:
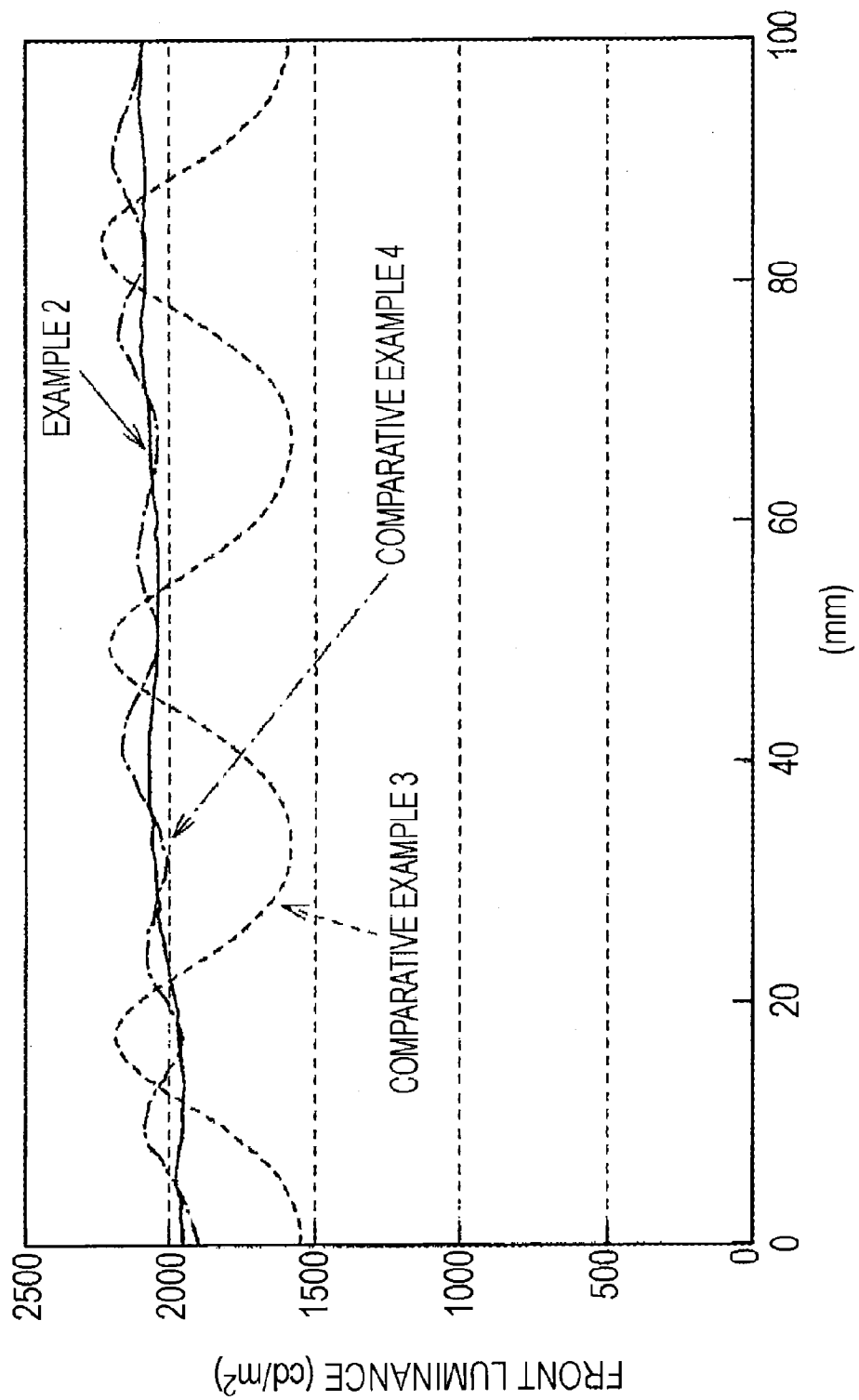
Figure 12:
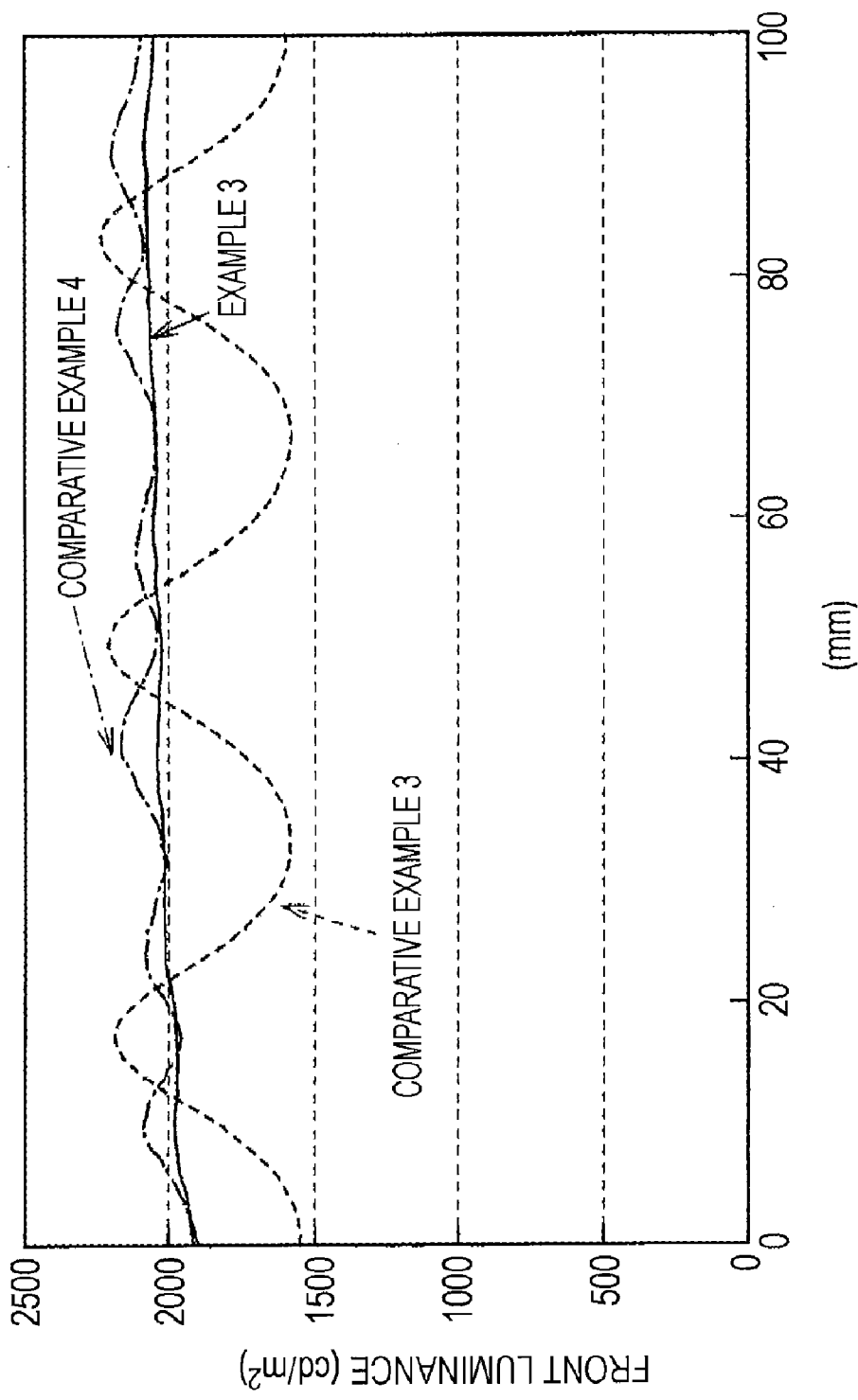
Figure 13:
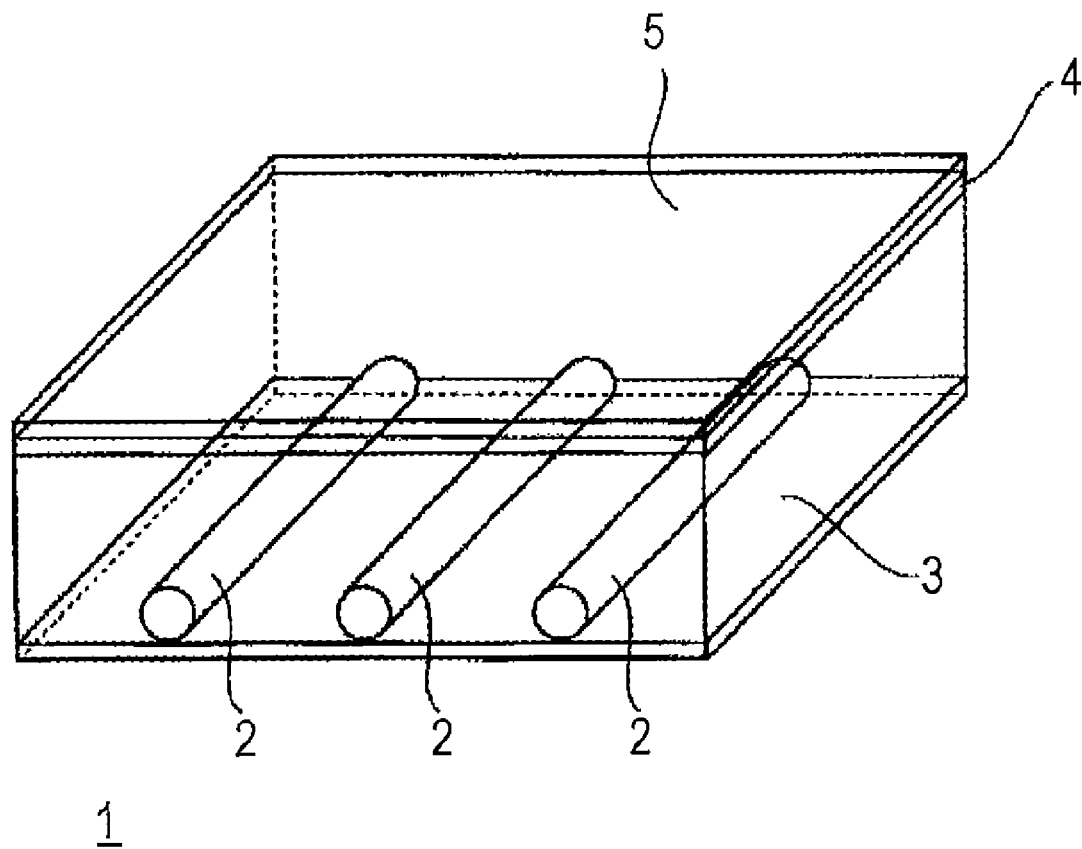
Figure 15:
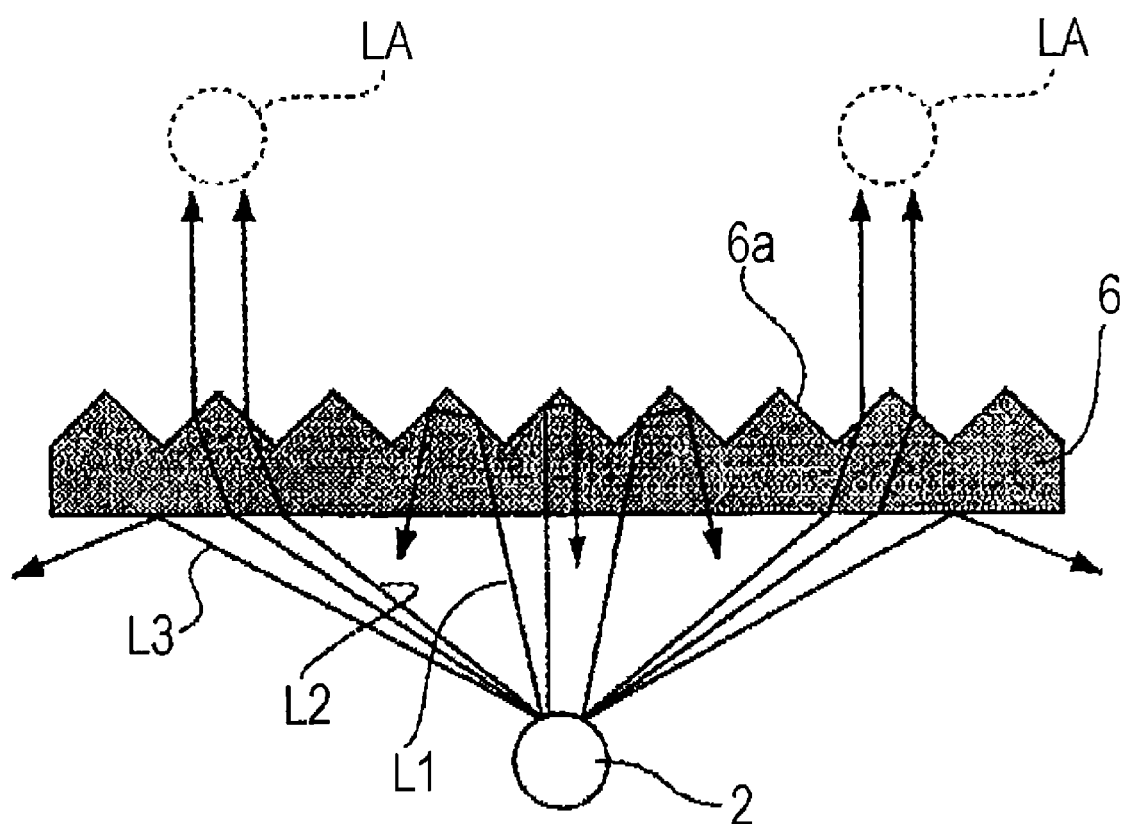

FIGS. 5(A)-5(D) includes cross-sectional views of other structural examples of the prism sheet shown in FIG. 1;

FIGS. 6(A)-6(E) includes cross-sectional views of other structural examples of the prism sheet shown in FIG. 1;

FIGS. 7(A)-7(B) includes cross-sectional views of the prism sheet shown in FIG. 1, illustrating a method for forming the same;

FIG. 8 is a schematic perspective view of a surface emitting device according to a second embodiment;

FIG. 9 is a graph showing the measurements of the luminance uniformity test of the surface emitting device of the invention with reference to Example 1;

FIGS. 10(A) and 10(B) are cross-sectional views of prism sheets of the surface emitting device of this embodiment, wherein FIG. 10(A) shows Example 2 and FIG. 10(B) shows Example 3;

FIG. 11 shows the measurements of luminance uniformity tests of Example 2 and Comparative Examples 3 and 4;

FIG. 12 shows the measurements of luminance uniformity tests of Example 3 and Comparative Examples 3 and 4;

FIG. 13 is a schematic perspective view of a conventional surface emitting device 1;

FIGS. 14(A) and 14(B) are diagrams for describing the structure and luminance distribution of the conventional surface emitting device, wherein FIG. 14(A) shows an example in which a conventional diffuser is used; and FIG. 14(B) shows an example in which a conventional prism sheet is used; and FIG. 15 is an optical path diagram showing the relationship between a conventional prism sheet and line light sources.

DETAILED DESCRIPTION

Referring to the drawings, embodiments are described hereinbelow.

First Embodiment

FIG. 1 is a schematic perspective view of a surface emitting device 10 according to a first embodiment; FIG. 2(A) is a cross-sectional view of the surface emitting device 10 taken along line II-II of FIG. 1; and FIG. 2(B) is a cross-sectional view of a prism sheet 16. The surface emitting device 10 is a direct-lighting type backlight unit for a liquid crystal display, for example.

The surface emitting device 10 of this embodiment includes line light sources 12, a reflector 13, a diffusing sheet 14 composed of a diffuser or a diffusion sheet, a prism sheet 16 serving as a light-source-image division sheet, and a casing 11 for housing them. The reflector 13 and the diffusing sheet 14 are disposed in opposed positions, between which a plurality of line light sources 12 is disposed in parallel at regular pitches.

The line light source 12 may be a known light source, e.g., a fluorescent tube such as a cold-cathode tube or a hot-cathode tube. The reflector 13 may be made of any light-reflective material such as aluminum, foam polyethylene terephthalate (PET), or polycarbonate. Concrete examples are a light reflection sheet E60L (trade name, manufactured by Kimoto Co., Ltd.) and Crystal White (trade name, manufactured by Japan Sky Aluminum Co., Ltd.)

The diffusing sheet 14 serves as the light-exiting surface of the surface emitting device 10, which diffuses the light-source images divided by the prism sheet 16, thereby uniformizing the luminance of the light exiting from the light-exiting surface. The surface emitting device 10 has a liquid-crystal display panel (not shown) on the light-exiting surface, thus allowing the liquid-crystal display panel to be irradiated with uniform-luminance light. This improves the quality of images formed on the liquid-crystal display panel.

The diffusing sheet 14 may be made of any light-transmissive and light-diffusing material such as a widely used diffuser or a diffusion film. The diffuser is made of, for example, acryl or polycarbonate. Concrete examples are DR-60C (trade name, manufactured by Nitto Resin) and NB01 (trade name, manufactured by Mitsubishi Rayon Co., Ltd.). The diffusion sheet is used to assist light diffusion, and is made of PET or the like. Concrete examples are D114 (trade name, manufactured by TSUJIDEN Co., Ltd.), D511 (trade name, manufactured by Tsujimoto Denki KK), and Light-Up 100S (trade name, manufactured by Kimoto Co., Ltd.). There may be at least one of the diffuser and diffusion sheet, or alternatively, a laminate thereof may be used.

The details of the prism sheet 16 serving as a light-source-image division sheet according to the embodiment are described below.

Referring to FIG. 2(A), the prism sheet 16 is disposed between the line light sources 12 and the diffusing sheet 14. In this embodiment, triangular-cross-section linear protrusions (prisms) 16a are continuously disposed on the surface of the sheet with a flat portion 16d therebetween. The direction in which the linear protrusions 16a are arranged, that is, the direction perpendicular to the edge lines of the linear protrusions 16a (the lateral direction in FIG. 2(A)) is hereinafter referred to as a protrusion arranging direction. In this example, the linear protrusions 6a of the prism sheet 6 are disposed such that the edge lines 16b are in parallel to the extending direction of the line light sources 2. Alternatively, the edge lines 16b may intersect the line light sources 12 at a fixed angle (e.g., at 45°).

Preferably, the prism sheet 16 of this embodiment is constructed such that the lengths of the slopes of the linear protrusions 16a in the protrusion arranging direction are equal to the length of the flat portion 16d in the protrusion arranging direction. That is, as shown in FIG. 2(B), the length D1 and D2 of two slopes S1 and S2 of the linear protrusion 16a and the length D3 of the surface S3 of the flat portion 16d are equal in the protrusion arranging direction. The lengths of the slopes of the linear protrusion 16a and the surface of the flat portion 16d in the protrusion arranging direction may not necessarily be completely equal, and may be substantially equal as long as it offers the same effects.

The prism sheet 16 may be made of a light-transmissive resin material. As shown in FIG. 7(A), the linear protrusions 16a and a substrate 16p that supports them may be integrally molded of thermoplastic resin. Typical examples of the thermoplastic resin are polycarbonate, polymethylmethacrylate (PMMA), and polystyrene, although it may be any light-transmissive resin. As shown in FIG. 7(B), it is also possible that linear protrusions 16a made of energy (ultraviolet) cure resin may be transferred on a light-transmissive substrate 16p made of PET or the like. The size of the linear protrusions 16a and the interval therebetween can be set as appropriate according to the size of the light sources used and the interval therebetween.

Figure 3:
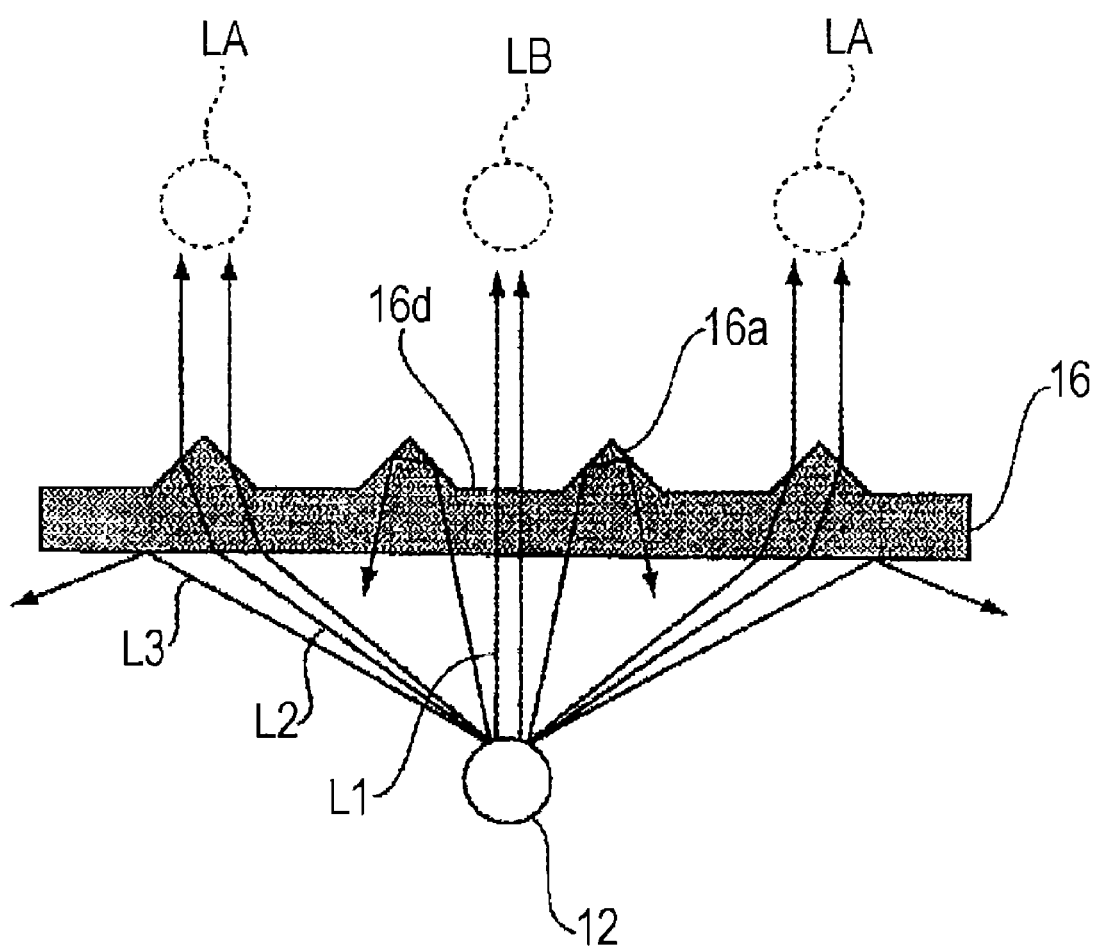
FIG. 3 is an optical path diagram showing the relationship between the prism sheet and the line light source of the surface emitting device shown in FIG. 1.

As schematically shown in FIG. 3, disposing the flat portion 16d parallel to the sheet surface between the triangular-cross-section prism-shaped linear protrusions 16a allows the light L1 exiting from the light source 12 and entering the prism sheet 16 in the direction of the normal to pass through the flat portion 16d without total reflection, thereby forming a light-source image LB at the front. The linear protrusion 16a serves the original function of raising the light from the light source 12 entering at a fixed angle to the front, thereby forming two divided light-source images LA.

Accordingly, the use of the prism sheet 16 having the flat portion 16d causes not only the two divided light-source images LA formed by the linear protrusions 16a but also the light-source image LB formed by the flat portion 16d, thus forming the three main divided light-source images. Thus, this embodiment can increase the number of divisions of the light-source image to reduce the inter-image distance, thereby improving the uniformity of luminance distribution.

To distribute luminance uniformly, it is effective to make the divided light-source images equal in luminance in addition to divide the light-source image. Here, the luminance of one light-source image is in proportion to the length of the surface through which the light-source image is generated in the protrusion arranging direction. That is, the longer the length of the surface in the protrusion arranging direction, the larger the amount of light incident on the surface is, so that the luminance of the light-source image increases. Accordingly, when the lengths of the three surfaces of the linear protrusions 16a and the flat portion 16d in the protrusion arranging direction are set equal, the amount of lights that are raised by the surfaces and exit upward from the prism sheet 16 become equal, so that the luminances of the three divided light-source images become equal, thus enhancing the uniformity more effectively.

The embodiment can make the luminance distribution uniform without using a thick diffuser, thus reducing light loss. This increases the luminance and reduces the thickness of the whole unit. Moreover, this can expand the interval between the light sources to reduce the number of light sources, which is advantageous in saving power and reducing cost.

FIG. 4(A) is a picture of the light-source image of light that has passed through the conventional prism sheet 6; and FIG. 4(B) is a picture of the light-source image of light that has passed through the prism sheet 16 of this embodiment. Providing the flat portion 16d can reduce the distance between the light-source images in comparison with that without the flat portion. This facilitates optimization of light-source images, thus facilitating uniformization of the luminance.

Figure 5:
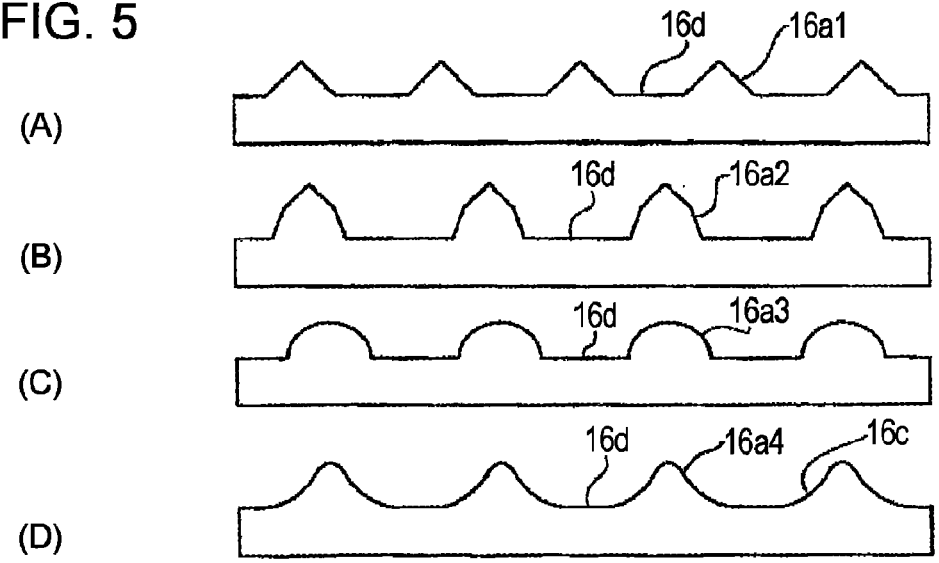
Figure 6:
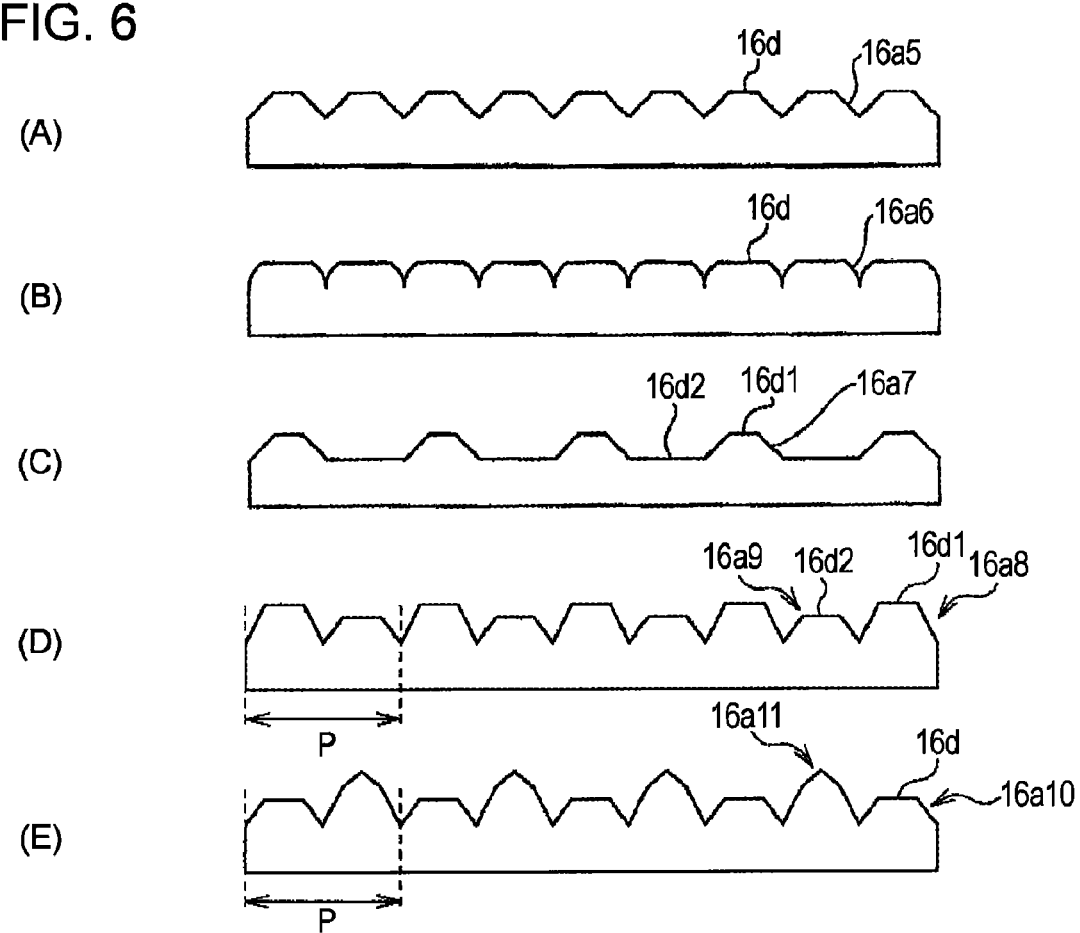

The linear protrusions 16a of the prism sheet 16 can be of the shapes shown in FIGS. 5 and 6. FIGS. 5(A) to 5(D) show examples in which the flat portions 16d are disposed between the linear protrusions 16a. FIGS. 6(A) to 6(E) show examples in which the flat portions 16d are disposed on part of the linear protrusions, or specifically, on the tops of the linear protrusions. However, FIG. 6(C) shows an example in which the flat portions 16d are disposed both between the linear protrusions and on the tops of the linear protrusions.

Linear protrusions 16a1 shown in FIG. 5(A) are each shaped like a prism corresponding to the linear protrusion 16a of the embodiment. Linear protrusions 16a2 shown in FIG. 5(B) each have a shape in which the slopes of the prism have different inclinations. Linear protrusions 16a3 shown in FIG. 5(C) each have a circular or elliptical cross section, e.g., a cylindrical lens shape. Linear protrusions 16a4 shown in FIG. 5(D) each have a substantially triangular cross section with a curved top, and have a concave portion 16c between the protrusions to form a convex and concave compound lens.

The presence of the flat portion 16d between the linear protrusions 16a improves the accuracy of forming the linear protrusions 16a on the prism sheet 16. The protrusions of the prism sheet 16 are generally transferred by embossing using an original plate engraved with protrusions. If there is no space (flat portion) between the linear protrusions 16a, the original plate must have multiple sharp protrusions. The tips of the protrusions of such an original plate are prone to be bent or distorted during processing, so that it is difficult to form desired protrusions. Therefore, it is useful to provide the flat portion 16d between the linear protrusions 16a when the base angle of the linear protrusion 16a is between 45° and 90°, particularly, closer to 90°.

Linear protrusions 16a5 shown in FIG. 6(A) each have a flat portion 16d on the top of the prism. Linear protrusions 16a6 shown in FIG. 6(B) each have a flat portion 16d on the top. Linear protrusions 16a7 shown in FIG. 6(C) each have a flat portion 16d1 on the top and have a flat portion 16d2 therebetween. FIG. 6(D) shows an example in which linear protrusions 16a8 and 16a9 are disposed which have two kinds of trapezoidal cross section of different base angles. The linear protrusions 16a8 and 16a9 are trapezoidal in cross section, whose upper surfaces (tops) are flat portions 16d. FIG. 6(E) shows an example in which linear protrusions 16a10 of trapezoidal cross section and linear protrusions 16a11 of symmetrical pentagonal cross section are provided. The upper surface of the linear protrusion 16a10 is the flat portion 16d.

The presence of the flat portion 16d on the top of each linear protrusion 16a improves the accuracy of forming the linear protrusions 16a on the prism sheet 16. The prism sheet 16 is generally formed in such a way that an original plate engraved with protrusions is filled with resin or the like and hardened, and then these protrusions are transferred. When the tops of the linear protrusions 16a are sharp pointed, the bottom of the original plate must have narrow recesses. With such an original plate, it is difficult to form desired protrusions because the bottommost portion of the recesses cannot be filled with resin. Therefore, it is useful to provide the flat portion 16d between the linear protrusions 16a when the angle between the slope of the top of the linear protrusion 16a and the plane of the sheet is between 45° and 90°, particularly, closer to 90°.

Particularly, the cross section shown in FIG. 6(C) allows the accuracy of the protrusions of the original plate to be achieved and the recesses of the original plate to be filled with resin without clearance, because it has the flat portions 16d1 at the tops of the linear protrusions 16a and the flat portion 16d2 between the linear protrusions 16a, which significantly improves the transfer performance of the protrusions onto the prism sheet 16.

The protrusions of FIGS. 6(D) and 6(E) are prisms of different shapes arranged alternately and periodically. The total number of the surfaces of the linear protrusion 16a and the flat portion 16d in one period P are five in FIG. 6(D) and seven in FIG. 6(E). In those cases, the number of light-source images formed above the prism sheet 16 is five in FIG. 6(D) and seven in FIG. 6(E). The protrusions 16a of FIG. 5(B) are pentagonal in shape and arranged continuously with the flat portion 16d therebetween. The four slopes of the linear protrusion 16a and the flat portions 16d constitute five surfaces in total. Therefore, five light-source images are formed. Thus, the number of divided light-source images depends on the shape and combination of the linear protrusions 16a and is not limited to the foregoing examples.

In the examples of FIGS. 6(A), 6(D), and 6(E), the lengths of the slopes of the protrusion 16a and the flat portion 16d in the protrusion arranging direction are equal. This makes the amounts of lights that exit from the surfaces equal, ensuring uniformity more effectively.

The example of FIG. 6(D) has a plurality of flat portions 16d1 and 16d2 in one period P. In this case, the flat portion 16d1 and the flat portion 16d2 in the period P are regarded as one flat portion, and the sum of the lengths of the flat portions 16d1 and 16d2 in the protrusion arranging direction is set equal to the lengths of the slopes of the linear protrusions 16a in the protrusion arranging direction. Thus, the length of the flat portion 16d1 and the length of the flat portion 16d2 may not necessarily be equal as long as the sum of the lengths of the flat portions 16d1 and 16d2 is set equal to the lengths of the slopes.

The shapes of the linear protrusions 16a shown in FIGS. 5 and 6 are merely examples and may be another shape, e.g., a conical or pyramidal form. The conical or pyramidal protrusions can be arranged in matrix form on the prism sheet 16. Here, it is preferable that the lengths of the surfaces of the protrusions in the protrusion arranging direction of the prism sheet 16 be equal. All the linear protrusions 16a may not necessarily have the same shape; two or more kinds of protrusion different in shape, pitch, or height may be arranged on the same plane. The linear protrusions 16a may not necessarily be disposed on the front surface of the prism sheet 16 (adjacent to the diffusing sheet 14); they may be disposed on the back surface of the prism sheet 16 (adjacent to the light sources 12), or in some cases, they may be disposed on both the front and back surfaces. The linear protrusions 16a formed on the front and back surfaces of the sheet may be different in shape, pitch, refractivity, and the direction of the edge line.

Second Embodiment

FIG. 8 is a schematic perspective view of a surface emitting device 20 according to a second embodiment. The components of FIG. 8 corresponding to those of the first embodiment will be given the same numerals and their detailed description will be omitted.

The surface emitting device 20 of this embodiment includes point light sources 22, a reflector 13, a diffusing sheet 14 composed of a diffuser or a diffusion sheet, a prism sheet 16 serving as a light-source-image division sheet, and a casing 11 for housing them. The reflector 13 and the diffusing sheet 14 are disposed in opposed positions, between which a plurality of linearly arranged point light sources 22 are disposed in lines.

The prism sheet 16 has the same structure as the first embodiment, in which the edge lines 16b of the prism-shaped linear protrusions 16a are in parallel to the direction of the arrangement of the point light sources 22. Alternatively, the edge lines of the prism sheet 16 may be arranged at an angle (e.g., 45°) with respect to the direction of the arrangement of the point light sources 22.

The point light sources 22 are LEDs, organic ELs or the like. Red, green, and blue (RGB) point light sources are arranged linearly in sequence. Needless to say, the point light sources 32 may be white LEDs.

As in the first embodiment, the prism sheet 16 of this embodiment also has the flat portion 16d parallel to the sheet surface between the triangular-cross-section prism-shaped linear protrusions 16a. This allows the light exiting from the point light sources 22 and entering the prism sheet 16 in the direction of the normal of the prism sheet 16 to pass through the flat portion 16d without total reflection, thereby forming a light-source image at the front. The linear protrusion 16a serves the original function of raising the light that enters from the light source 12 at a fixed angle to the front, thereby forming two divided light-source images.

Accordingly, the use of the prism sheet 16 having the flat portion 16d causes not only the two light-source images LA divided by the linear protrusions 16a but also the light-source image formed by the flat portion 16d, thus forming the three main divided light-source images. Thus, this embodiment can increase the number of divisions of the light-source image to reduce the inter-image distance, thereby improving the uniformity of luminance distribution.

EXAMPLES

Example 1

The uniformity of luminance of the surface emitting device according to the first embodiment was tested under the following conditions. The results are shown in FIG. 9.

Diffusing sheet 14: diffusion sheet D114 (manufactured by Tsujiden KK)

Line light source 12 and Reflector 13: liquid crystal TV KDL-S19A10 (manufactured by Sony Corporation)

Prism sheet 16: flat portion 16d: 15 μm in width linear protrusion 16a: prism with a base of 50 μm and a vertical angle of 90°

Distance from line light source 12 to prism sheet 16: 7 mm

Luminance meter: RISA-COLOR (manufactured by Highland)

The prism sheet 26 was manufactured in the following way:

A metal plate for hot pressing was used as an original plate in which an isosceles right-angled triangle in cross section with a vertical angle of 90°, a base of 50 μm, and a height of 25 μm and a flat portion with a width of 15 μm are continuously and alternately engraved. Thermoplastic resin, a polycarbonate resin sheet (FE2000 manufactured by Mitsubishi Engineering-Plastics Corporation) with a thickness of 200 µm, was pressed under 9.8 MPa (100 kgf/cm²) at 180° C. for ten minutes.

Comparative Example 1

A similar luminance uniformity test was conducted without the prism sheet 16 of the first embodiment. The results are shown in FIG. 9.

Comparative Example 2

A similar luminance uniformity test was conducted with the conventional prism sheet 6 having no flat portion in place of the prism sheet 16 of the first embodiment. The results are shown in FIG. 9. The prism sheet 6 was manufactured in the following way:

A metal plate for hot pressing was used as an original plate in which an isosceles right-angled triangle in cross section with a vertical angle of 90°, a base of 50 µm, and a height of 25 µm is regularly and continuously engraved. Thermoplastic resin, a polycarbonate resin sheet (FE2000 manufactured by Mitsubishi Engineering-Plastics Corporation) with a thickness of 200 µm, was pressed under 9.8 MPa (100 kgf/cm²) at 180° C. for ten minutes.

The results in FIG. 9 show that the embodiment offers a preferred surface emitting device with high luminance uniformity. In contrast, Comparative Examples 1 and 2 could not optimize the light-source image and thus could not achieve luminance uniformity.

Example 2

FIG. 11 shows the results of a luminance uniformity test conducted in the same way as in Example 1 except that a prism sheet 26 shown in FIG. 10(A) was used in place of the prism sheet 16 under the following conditions. The cross section of the prism sheet 26 corresponds to that shown in FIG. 6(D). The numerals indicative of sizes including the widths of the protrusions are expressed in the unit µm.

Diffusing sheet 14: D141Z (manufactured by Tsujiden KK)

Prism sheet 16: two kinds of protrusions 26a8 and 26a9 having an isosceles trapezoidal cross section Distance from the line light source 12 to the prism sheet 16: 15.5 mm Distance between line light sources 12: 33 mm The prism sheet 26 was manufactured in the following way:

A metal plate for hot pressing was used as an original plate in which a trapezoid (26a8) that has a cross section with a base angle of 60°, an upside of 20 µm, and a lower side of 100 µm and a trapezoid (26a9) that has a cross section with a base angle of 40°, an upside of 20 µm, and a lower side of 100 µm are continuously and alternately engraved. The five surfaces of the slopes of the protrusions 26a8 and 26a9 and the flat portion (26d1 and 26d2) composed of the flat portions 26d1 and 26d2 in the period P were equal in length in the protrusion arranging direction. Specifically, they were each 40 µm in length. The thermoplastic resin material and the hot pressing conditions were the same as those of the first embodiment.

Example 3

FIG. 12 shows the results of a luminance uniformity test conducted in the same way as in Example 2 except that a prism sheet 36 shown in FIG. 10(B) was used in place of the prism sheet 26. The cross section of the prism sheet 36 corresponds to that shown in FIG. 6(E).

The prism sheet 36 was manufactured in the following way:

A metal plate for hot pressing was used as an original plate in which a trapezoid (36a10) that has a cross section with a base angle of 43°, an upside of 25 µm, and a lower side of 75 µm and a symmetrical pentagon in cross section (36a11) that has a base angle of 54.3°, an angle of 25° with respect to the horizontal surface, and a base of 100 µm were continuously and alternately engraved. The seven surfaces of the slopes of the protrusions 36a10 and 36a11 and a flat portion 36d at the top of the protrusion 36a10 in the period P were equal in length in the protrusion arranging direction. Specifically, they were each 25 µm in length.

Comparative Example 3

A luminance uniformity test was conducted under the same conditions as in Example 2 except that the prism sheet 26 was not provided. The results are shown in FIGS. 11 and 12.

Comparative Example 4

A luminance uniformity test was conducted under the same conditions as in Example 2 except that the conventional prism sheet 6 having no flat portion was provided in place of the prism sheet 26. The results are shown in FIGS. 11 and 12.

FIGS. 11 and 12 show that Comparative Example 3 without the prism sheet has large unevenness in luminance, and Comparative Example 4 with the conventional prism sheet having no flat portion also has unevenness in luminance, although better than Comparative Example 3. In contrast, Example 2 and Example 3 in which different kinds of polygons and flat portions were combined exhibited preferable luminance distribution with no unevenness.

It should be understood that the embodiments are not limited to the examples described above and that various modifications may be made according to the technical spirit.

For example, in the foregoing embodiments, the protrusions 16a of the light-source-image division sheet are shaped in lines. Instead, the protrusions may be shaped like cones or pyramids (triangular pyramids, quadrangular pyramids or the like). This also offers the same effects as in the foregoing embodiments by providing the flat portion 16d between the conical or pyramidal protrusions or on part thereof.

When surface roughening such as graining is applied to the back surface of the prism sheet 16 on which the linear protrusions 16a and the flat portions 16d are not formed, the degradation of the optical characteristic due to the damage or the like of the back surface during handling of the sheet can be reduced.

In the foregoing embodiments, the surface emitting devices 10 and 20 each have one prism sheet 16 serving as a light-source-image division sheet. The embodiments are not limited to that and may have two or more stacked sheets. In this case, differentiating the directions of the edge lines of the prism sheets can reduce the generation of moiré (interference fringes).

The surface emitting devices according to the embodiments are not necessarily used as the backlight unit for a liquid crystal display device. The use of a diffuser having a dot pattern as a diffusing sheet can achieve a low-profile surface emitting device by an appropriate combination.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A surface emitting device comprising:
a diffusing sheet constituting a light exiting surface;
a reflector disposed opposite to the diffusing sheet;
a plurality of light sources disposed between the diffusing sheet and the reflector; and
a light-source-image division sheet disposed between the diffusing sheet and the light sources,
wherein the light-source-image division sheet has a plurality of linear protrusions on at least one of the front and back surfaces thereof wherein the linear protrusions include a flat portion on top thereof; and
wherein the light-source-images division sheet has a flat portion parallel to the sheet surface between the adjacent protrusions.

2. The surface emitting device according to claim 1, wherein
the protrusion is a polygonal prism or a polygonal pyramid having a plurality of surfaces; and
the surfaces of the protrusions and the surface of the flat portion are equal in length in the protrusion arranging direction.

3. The surface emitting device according to claim 1, wherein the light source is a line light source.

4. The surface emitting device according to claim 1, wherein the light source is a point light source.

5. A liquid crystal display comprising:
a liquid-crystal display panel; and
a surface emitting device that illuminates the liquid-crystal display panel from the back,
wherein the surface emitting device includes: a diffusing sheet constituting a light exiting surface; a reflector disposed opposite to the diffusing sheet; a plurality of light sources disposed between the diffusing sheet and the reflector; and a light-source-image division sheet disposed between the diffusing sheet and the light sources,
and wherein the light-source-image division sheet has a plurality of linear protrusions on at least one of the front and back surfaces thereof wherein the linear protrusions include a flat portion on top thereof; and
the light-source-image division sheet has a flat portion parallel to the sheet surface between the adjacent protrusions.

* * * * *